April 21, 1964  J. V. BAATRUP  3,129,884
VALVE DEVICE FOR GAS SUPPLY TO TWO DIFFERENT
POINTS OF CONSUMPTION
Filed June 22, 1961

United States Patent Office 3,129,884
Patented Apr. 21, 1964

3,129,884
VALVE DEVICE FOR GAS SUPPLY TO TWO
DIFFERENT POINTS OF CONSUMPTION
Johannes Vagn Baatrup, Sonderborg, Denmark, assignor to Danfoss ved ing. M. Clausen, Nordborg, Denmark, a company of Denmark
Filed June 22, 1961, Ser. No. 118,861
Claims priority, application Germany June 22, 1960
9 Claims. (Cl. 236—1)

The present invention relates to a valve device for gas supply to two different points of consumption, for example to a baking oven and to a grill in a gas cooker.

For this purpose the general method is to equip each point of consumption with a valve, which valve can be adjusted by means of an appropriate operating knob. Two complete valve units with all accessories are employed, i.e., two supply connections, two operating knobs, and two ignition flame safety devices or similar. If no particular locking possibilities are provided for, the arrangement involves the risk that both valves can be operated at the same time, which is to be avoided in the case of many gas cooker designs.

In consideration of the above, the present invention relates to a construction wherein two freely movable valve discs, kept apart from each other by means of a spring, are placed on a common shaft fitted with an operating knob, and the shaft on the other side of the valve disc is provided with a dog which can engage the valve disc, and will thus be relatively movable in an axial direction in relation to the two valve seats facing each other.

From a zero-position in which both valves are closed, one valve or the other can be operated by pulling out or pressing in the knob, during which operation the valve not being operated will remain in the closed position. Thus, distribution of gas is accomplished through a single valve device, which is operated by means of a single knob. Mutual locking of the opposite valve, still controlled by the common shaft, is thus achieved automatically.

Even a single ignition flame safety valve will suffice, provided the mechanical operating element of the latter is so arranged that, by means of a link coupled to the shaft, it is movable to the ignition position at the two extreme displaced positions of the shaft. From a constructional point of view the most advantageous solution is to give the two surfaces of the valve discs, which face each other, the shape of a cone, and to let these conical surfaces actuate the ignition flame safety valve directly.

By pulling out or pressing in the operating knob to the respective extreme positions the gas flame can thus be ignited, and one valve or the other can be kept open in a displaced position near the extreme one. Each particular position should preferably be locked by means of a stopping arrangement.

In case the gas supply to one point of consumption is to be dependent upon temperature the rotational movement of the operating knob can be utilized for adjustment of a predetermined value of temperature, since one freely movable end of the shaft is coupled to a mechanical connecting element which, by turning the shaft, will adjust a thermostatic valve, which is also coupled on, to the predetermined value.

The present invention is further characterized by the following description of a constructional embodiment in connection with the drawing, wherein.

Figure 1:
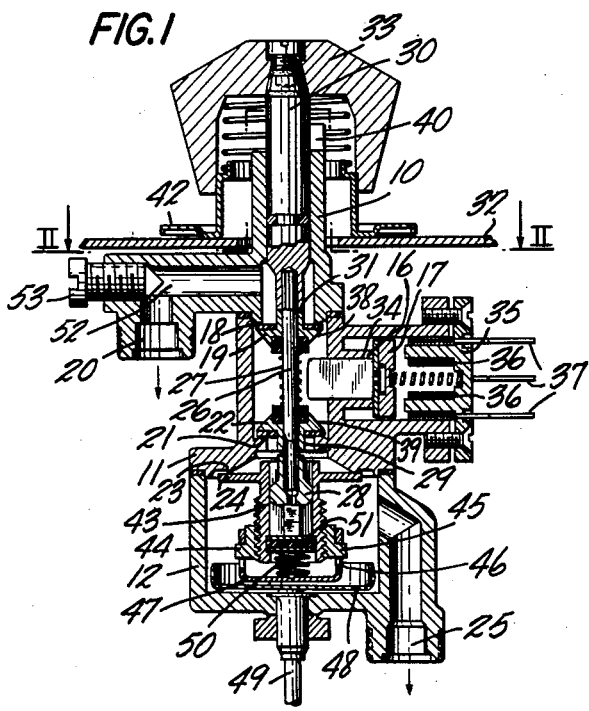
FIGURE 1 is a longitudinal section of a valve device according to the method of the present invention.

The valve device according to the method forming the subject of the present invention employs a three-sectional housing, consisting of the top section 10, the center section 11, and the bottom section 12, which are all connected together with suitable packings by means of the screws 13 and 14. The gas is supplied through the connecting branch 15 in the center section and the ignition flame safety valve with the seat 16 and the valve disc 17. Thus, the gas can be distributed to one side through the grill shut-off valve with the seat 18 and the valve disc 19 and through the branch pipe 20 to the grill, or to the other side through the baking oven shut-off valve with the seat 21 and the valve disc 22 and the baking oven regulation valve with the seat 23 and the valve disc 24 through the pipe branch 25 to the baking oven.

The two valve discs 19 and 22 forming part of the grill and baking oven shut-off valves are movable on a common shaft 26, and are forced away from each other and towards their seats by the spring 27. The bottom end of the common shaft 26 is fitted with a dog 28, facing the flange member 29 and the valve disc 22. The top end of the shaft is connected to an extension piece 30, facing a flange 31 on the valve disc 19. Outside the covering plate 32 of the cooker, the tip of the extension piece 30 is provided with an operating knob 33. By pressing in the operating knob 33, the grill shut-off valve 18, 19 opens, and by pulling out the knob the baking oven shut-off valve is opened. Through the increased pressure of the spring 27, the other valve will always be kept firmly in the closed position. The valve discs 19 and 22 are slip fitted on the shaft 26, and a helical spring keeps the discs against the seats in the unactivated position of the entire unit. However, by pushing the knob 33 downwards, the valve disc 19 will be engaged by the flange 31 and the valve 18, 19 will open. At the same time the shaft 26 will slide in the center bore of disc 22 and the helical spring between the discs 19 and 22 will be compressed. Upon pulling knob 33, valve seat 22 will be engaged by dog 28 carried by the lower end of shaft 26 and the valve 21, 22 will open. In this case the helical spring will also be compressed and will press the other valve disc, in this case disc 19, against its seat. In other words, the operating elements of the valves 18, 19 and 21, 22 consist of a shaft, two valve discs each having a center-bore through which the shaft slides, a helical spring disposed between the valve discs to keep them against their respective seats in rest position, and an operating member carried by the shaft for each disc.

Figure 2:
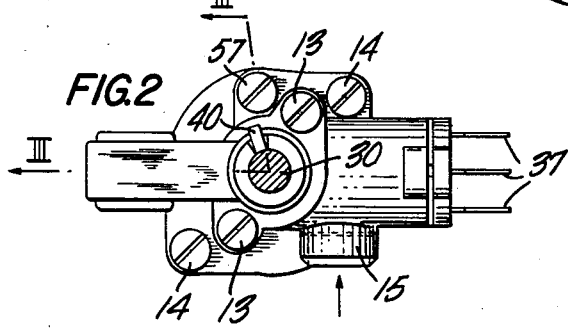
FIGURE 2 is a cross section on line II—II in FIGURE 1, the operating knob, the dial plate, and the covering plate of the cooker being omitted, however.

The ignition flame safety valve is provided in the usual way with an operating element 34, by means of which the valve can be opened for a short period until the solenoid 35, through the winding 36 of which passes a current dependent upon the temperature in the grill or the baking oven, respectively, is able to hold the valve disc 17 in the open position. For this purpose the valve disc 17 is made from a magnetizable material. Because of the two-fold application of the ignition flame safety valve, more leads 37 for thermocouples in the grill and the baking oven are required. The element 34 is suitably in the form of a plate mounted in a gas inlet port and is connected with the non-rotatable valve disc 17 which bears upon a valve seat 16. The fuel inlet port 15 is located on the rear-side of the housing as seen in FIG. 2. The fuel enters the chamber below the valve disc 17, viz. in FIG. 1 to the left of valve disc 17. As long as element 34 is de-energized, i.e. not moved toward the horseshoe-shaped electromagnet 35, the connection to the distribution chamber is closed, but when pulling or pushing the shaft 26, the valve disc 22, or the valve disc 19, will move the element 34 into its energized position, thereby unseating the disc 17 and allowing the fuel to flow on both sides of the element 34 to the distribution chamber and then through either the valve 18, 19 or the valve 21, 22 to the point of consumption.

The valve disc 19 of the grill shut-off valve has a conical surface 38 and the valve disc 22 of the baking oven shut-off valve has a conical surface 39, which surfaces can both engage the operating element 34 in such a way, that the ignition flame safety valve 16, 17 will open when pulling or pressing hard the operating knob 33. When the sequence of ignition has been completed in the course of a short time, the mechanical operation of the ignition flame safety valve can be discontinued because the valve is now kept open magnetically. Thus, a position of the common shaft 26 somewhat within the extreme position of displacement will be sufficient to keep open the desired shut-off valve 18, 19 or 21, 22.

Figure 4:
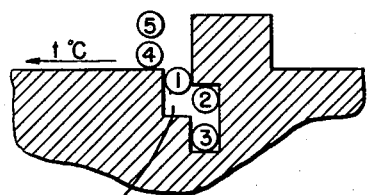
FIGURE 4 is a schematic representation of the stepping arrangement for adjustment of the operating knob.

To ensure correct operation of the knob 33, the extension piece 30 is fitted with a pin 40 which will mesh with a stepped slit 41. The encircled figures in FIGURE 4 show which positions of the operating knob 30 are required to achieve each individual function. In the zero-position 1 both shut-off valves are closed. In position 2 the grill shut-off valve is open. Through a brief depression in position 3 the ignition flame safety valve is mechanically opened. On the other hand, the baking oven shut-off valve opens in position 4. By pulling the knob for a brief period in position 5, the ignition flame safety valve is again mechanically operated. By turning the knob in position 4 the predetermined value of the baking oven temperature can be adjusted. This operation will be described in detail in the following. A dial plate 42 gives all details about each setting.

The dog 28 on the bottom end of the common shaft 26 is hexagonal and can slide in a hexagonal sliding track in the connecting element 43, which is carried by the valve disc 24. This connecting element is provided with an external thread, and is screwed upwards or downwards by the turning movement of the threaded sleeve 44. The threaded sleeve 44 is provided with lugs 45 seated in longitudinal slits 46 in the outer legs of a U-shaped bi-metal element 47, which is secured at its center to a cup 48 forming part of a diaphragm chamber, e.g. by welding. Pressure fluid from a thermal phial placed in the oven is fed to the diaphragm chamber through the capillary tube 49. The diaphragm chamber is, in conventional manner, composed of the cup-shaped portion 48 which is illustrated and a thin and movable operating diaphragm (not shown). The chamber is defined between these two elements and is connected to the capillary tube 49. As the phial of the thermostatic element is heated up, the operating medium inside the system will expand and will move the system upwards. A spring 50, placed between the central portion of the bi-metal element and a seal 51 on the connecting element 43, functions in several ways:

Firstly, it retains the seal 51, secondly, it presses the threaded sleeve 44 with the lugs 45 against the outer edges of the longitudinal slit 46, and thirdly, in closing the regulation valve it presses the valve disc 24 to bear against the seat 23.

When turning the knob 33 the valve disc 24 is moved relatively to its seat 23. The adjustment motion will counteract the motion of the diaphragm chamber 48, which motion depends upon the oven temperature. The U-shaped bi-metal strip 46 will neutralize the influence of space temperature. At rising space temperature the outer legs are bent outwards, causing the distance between the outer edges of the slit and the point of attachment to the diaphragm chamber to be reduced, so that the influence of the space temperature on the pressure fluid of the thermal phial system is compensated for.

To obtain the most narrow design the two outlet branches 20 and 25 lead in the same direction away from the covering plate 32 of the cooker. In the present case a transversal boring 52 in the top section 10 of the housing is used. The transversal boring can advantageously be terminated by an adjustable throttle device in the form of a screw 53, through which adjustment of gas supply to the grill can be carried out. The regulation valve 23, 24 is bridged by a shunting duct consisting of the boring 54 and the boring 55. This duct can be shut off in full or in part by the needle valve 56.

Figure 3:
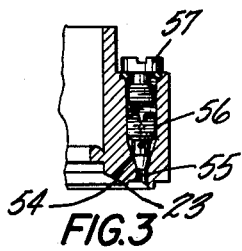
FIGURE 3 is a detail of the section on line III—III in FIGURE 2.

The system can be shut off from outside by means of the screw 57. This measure was introduced to enable the same valve design to be used for different sorts of gas, for example city gas and propane gas. Screw 57 is nothing more than a locking screw. However, it prevents fuel from flowing through the threads of screw 56 and to the surrounding air. In other words, it functions as a tightening and locking screw. Changing from propane gas to city gas is effected by means of screw 56. This screw has a longitudinal bore through the threaded part and the tip is shaped like a cone. In the threaded surface of the screw is a transverse bore, connecting the longitudinal bore to the fuel outlet opening. In FIG. 3 the screw 56 is shown in the position for use of propane fuel and the bores of the screw determine the amount of fuel flowing through.

The horizontal bore opens into a small chamber into which the fuel outlet also opens. However, with city gas operation, a greater amount of fuel is necessary and by unscrewing the screw 56 the conical tip will leave the conical seat and fuel can be supplied through both the orifice and the space between the conical parts of the screw and the seat. This space can be adjusted by turning the screw up or down and thus the amount of gas flowing through can be adjusted. To make this adjustment, it is necessary to remove screw 57, but after the adjusting operation the screw 57 is replaced and insures complete tightness.

That which I claim as my invention and desire to secure by Letters Patent is:

1. A valve device for supplying gas to two different points of consumption and adapted to be controlled by a single inlet safety device, which comprises means defining a gas inlet chamber, means defining a pair of axially-spaced-apart valve seats in said chamber, each communicating with one of said points of consumption, a pair of axially-spaced-apart valve disks each cooperating with one of said valve seats, a common stem slidably extending through both of said valve disks, resilient means normally biasing said valve disks away from each other and toward their respective seats, means carried by said common stem for displacing one of said valve disks away from its seat in one direction of movement of said stem and second means carried by said stem for displacing the other of said valve disks away from its seat in the opposite direction of movement of said stem, a common operating knob for displacing said stem in each of said two directions, means defining a gas inlet to said chamber intermediate said valve disks, and thermally actuated safety means for regulating the flow of gas through said inlet and thereby regulating the flow of gas to either one or the other of said different points of consumption, depending upon the position of the downstream valve disks.

2. A valve device for supplying gas to two different points of consumption and adapted to be controlled by a single inlet safety device, which comprises means defining a gas inlet chamber, means defining a pair of axially-spaced-apart valve seats in said chamber, each communicating with one of said points of consumption, a pair of axially-spaced-apart valve disks each cooperating with one of said valve seats, a common stem slidably extending through both of said valve disks, resilient means normally biasing said valve disks away from each other and toward their respective seats, means carried by said common stem for displacing one of said valve disks away from its seat in one direction of movement of said stem and second means carried by said stem for displacing the other of said valve disks away from its seat in the opposite direction of movement of said stem, a common operating knob for displacing said stem in each of said two directions, means defining a gas inlet to said chamber intermediate said valve disks, and thermally actuated safety means for regulating the flow of gas through said inlet and thereby regulating the flow of gas to either one or the other of said different points of consumption, depending upon the position of the downstream valve disks, and means actuatable by said stem to move said safety device to open said inlet in the two extreme displaced positions of said stem.

3. A valve device for supplying gas to two different points of consumption and adapted to be controlled by a single inlet safety device, which comprises means defining a gas inlet chamber, means defining a pair of axially-spaced-apart valve seats in said chamber, each communicating with one of said points of consumption, a pair of axially-spaced-apart valve disks each cooperating with one of said valve seats, a common stem slidably extending through both of said valve disks, resilient means normally biasing said valve disks away from each other and toward their respective seats, means carried by said common stem for displacing one of said valve disks away from its seat in one direction of movement of said stem and second means carried by said stem for displacing the other of said valve disks away from its seat in the opposite direction of movement of said stem, a common operating knob for displacing said stem in each of said two directions, means defining a gas inlet to said chamber intermediate said valve disks, and thermally actuated safety means for regulating the flow of gas through said inlet and thereby regulating the flow of gas to either one or the other of said different points of consumption, depending upon the position of the downstream valve disks, the surfaces of said valve disks facing said chamber being conical and means cooperating with said surfaces in the two extreme displaced positions of said stem for actuating said safety device to open said inlet.

4. A valve device as defined in claim 1, wherein said device includes a thermostatic valve and wherein one free end of said stem is coupled for rotational motion to a mechanical connecting element, said element being connected to adjust said thermostatic valve upon rotation of said stem.

5. A valve device as defined in claim 4, wherein said thermostatic valve has a valve disk and includes an adjustable sleeve on a thermostatic operating element, and wherein said connecting element, adjustable to a predetermined value, carries the valve disk of the thermostatic valve, and is in screwed connection with an adjustable threaded sleeve on a thermostatic operating element.

6. A valve device as defined in claim 5, wherein a U-shaped bent bi-metal element is coupled between the threaded sleeve and the thermostatic operating element, the bi-metal element being attached to the thermostatic operating element at its center, and acting on the threaded sleeve with the tips of the outer legs.

7. A valve device as defined in claim 6, wherein the threaded sleeve has lugs which engage longitudinal slits in the outer legs of the bi-metal element and spring means are provided to push the sleeve towards the outer ends of the longitudinal slit.

8. A valve device as defined in claim 1, further comprising between the operating knob and the valve seat nearest the knob, a branch connection in the form of a transverse bore leading to one of said points, said bore being closable at its free end by an adjustable throttle screw.

9. A valve device as defined in claim 1, further comprising a pin carried by said stem and means defining a stepped slit positioned to be engaged by said pin.

References Cited in the file of this patent
UNITED STATES PATENTS

| | | |
|---|---|---|
| 2,198,896 | Wetzel | Apr. 30, 1940 |
| 2,461,714 | Betz | Feb. 15, 1949 |
| 2,801,800 | Brumbaugh | Aug. 6, 1957 |
| 3,003,741 | McLanahan | Oct. 10, 1961 |